(12) United States Patent
Duenas et al.

(10) Patent No.: US 9,094,669 B2
(45) Date of Patent: *Jul. 28, 2015

(54) VIDEO ENCODER BIT ESTIMATOR FOR MACROBLOCK ENCODING

(71) Applicant: Cavium, Inc., San Jose, CA (US)

(72) Inventors: Alberto Duenas, Mountain View, CA (US); Francisco J. Roncero Izquierdo, Leganés (ES)

(73) Assignee: Cavium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,843

(22) Filed: Jul. 11, 2014

(65) Prior Publication Data

US 2014/0321550 A1    Oct. 30, 2014

Related U.S. Application Data

(62) Division of application No. 13/067,880, filed on Jul. 1, 2011.

(51) Int. Cl.
| | |
|---|---|
| *H04N 19/65* | (2014.01) |
| *H04N 19/176* | (2014.01) |
| *H04N 19/51* | (2014.01) |
| *H04N 19/149* | (2014.01) |
| *H04N 19/103* | (2014.01) |
| *H04N 19/152* | (2014.01) |

(52) U.S. Cl.
CPC ....... *H04N 19/00854* (2013.01); *H04N 19/103* (2014.11); *H04N 19/149* (2014.11); *H04N 19/152* (2014.11); *H04N 19/176* (2014.11); *H04N 19/51* (2014.11); *H04N 19/65* (2014.11)

(58) Field of Classification Search
None
See application file for complete search history.

(56) References Cited

U.S. PATENT DOCUMENTS

| | | | | |
|---|---|---|---|---|
| 7,961,783 | B2 * | 6/2011 | Kwon et al. | 375/240.03 |
| 8,144,789 | B2 * | 3/2012 | Tasaka et al. | 375/240.26 |
| 2002/0012395 | A1 | 1/2002 | Song et al. | |
| 2005/0053296 | A1 | 3/2005 | Srinivasan et al. | |
| 2008/0310505 | A1 | 12/2008 | Yan et al. | |
| 2010/0020872 | A1 * | 1/2010 | Shimizu et al. | 375/240.12 |
| 2010/0290527 | A1 * | 11/2010 | Park et al. | 375/240.13 |
| 2012/0269258 | A1 | 10/2012 | Yang et al. | |
| 2012/0281768 | A1 | 11/2012 | Matsuba et al. | |
| 2012/0328015 | A1 | 12/2012 | Kim et al. | |

* cited by examiner

*Primary Examiner* — Dave Czekaj
*Assistant Examiner* — Nam Pham
(74) *Attorney, Agent, or Firm* — Cooley LLP

(57) ABSTRACT

A video transmission system includes an encoder to receive video images, and encode them for transfer to a decoder. The video images include macroblocks having data that are encoded according to a prediction mode, such as inter-prediction or intra-prediction. A bit estimator for the encoded macroblock within the encoder estimates a size for the encoded macroblock and predicts whether it will be an illegal size. The bit estimator applies a bit estimation function using a number of header bits and a number of texture bits based on the prediction mode and transformed data of the macroblock.

7 Claims, 3 Drawing Sheets

VIDEO ENCODER BIT ESTIMATOR FOR MACROBLOCK ENCODING

CROSS REFERENCE TO RELATED APPLICATIONS

This application is a divisional of U.S. patent application Ser. No. 13/067,880 filed Jul. 1, 2011, the contents of which are incorporated herein by reference.

FIELD OF THE INVENTION

The present invention relates to encoding macroblocks within an image frame for video transmission. More particularly, the present invention relates estimating a size of an encoded macroblock.

DISCUSSION OF THE RELATED ART

Video compression schemes use prediction modes to reduce the amount of data needed to encode, transmit and decode an image frame. Inter-prediction may use spatial prediction, which is information from previous frames to predict the encoded values for the image frame. Intra-prediction may use spatial prediction, or information within the current frame, to predict possible data values of the encoded image.

Specifically, a compression scheme uses a prediction mode to predict parts of an image. These parts may be known as macroblocks. When a macroblock is encoded, data values related to luminance, chrominance, motion and other information may result from the encoder process. In some instances, the data for the encoded macroblock may exceed the amount of uncompressed raw data for the macroblock itself, even if using predicted values. Even lossy video compression schemes may cause macroblock coded information that exceeds the raw data values.

In these instances, known encoders may determine the occurrence of these macroblocks with large resulting data amounts. Upon detection, a special mode of the compression scheme is used that results in encoded macroblock data that does not exceed a size limit. The special mode serves to avoid encoding more data than necessary. Thus, for every macroblock that is predicted to exceed this size limit, the compression scheme uses the special mode to keep the resulting data under the size limit. Further, decoding using the special mode will be lossless.

Compression schemes using such special modes for encoding also use prediction schemes to identify when the special mode should be invoked. At some point in the compression scheme, the need for using the special mode is predicted. Once predicted, the compression scheme may switch over to using the special mode to encode the data.

Known compression schemes may predict whether to use a special mode for encoding during the mode selection. In other words, the compression scheme determines whether to use intra- or inter-prediction methods and, at that time, also determine whether to invoke any special mode encoding. These decisions may rely on statistics in place prior to actual transform and compression of the macroblock.

This scheme, however, may be very inaccurate, thereby resulting in high probabilities of false alarms the improperly invoke the special mode and of wrong decisions that result in illegal macroblock data sizes that still exceed a desired size. The drawbacks result in loss in compression efficiency.

Other known compression schemes may re-encode a macroblock with the special mode after it is determined that the encoded macroblock exceeds the size limit. After the macroblock is encoded, it is checked to see if it exceeds the size limits. If so, then the macroblock is encoded again using the special mode to reduce the resulting size to below the size limit. This scheme increases processing time and latency in the encoding process. Moreover, it is an extremely inefficient use of resources within an encoder to re-encode macroblocks.

SUMMARY OF THE INVENTION

The disclosed embodiments provide a bit estimation process to estimate the size of a macroblock after encoding. Such estimates may be used to decide whether to use a special prediction mode for encoding macroblocks to avoid illegal size issues. The disclosed compression scheme uses a prediction function for the bits consumption of the prediction mode for deciding whether to use inter-frame or intra-frame prediction. The disclosed compression scheme, however, does not wait until completion of the compression process to determine the value for bits consumption.

The prediction function may use an approximation of the number of bits used for encoding in the entropy encoder that uses results from the lossy encoding process after the intra-frame/inter-frame prediction mode decision has been done. The disclosed compression scheme may compare the predicted consumption by the encoding process with a threshold to decide if the predicted mode decision is to be overridden by the special prediction mode. If so, then the special prediction mode is used to encode the current macroblock.

The threshold used to decide whether to invoke the special prediction mode may be configurable to achieve a balance between false alarms and instances where the special prediction mode is not properly applied. The latter condition results in illegal macroblocks being encoded. The illegal macroblocks must still be detected, but the disclosed compression scheme reduces this number to a more manageable level over the known compression schemes described above.

The disclosed embodiments use a bit estimator within the encoding process to provide estimation of the bit consumption. The bit estimator may take into account texture bit estimation along with other information to estimate a size of the encoded macroblock. As noted above, the estimate may be used for various purposes, such as avoiding sending encoded macroblocks having an illegal size, rate control and slice size prediction.

According to the preferred embodiments, a method for estimating a size of an encoded macroblock within a video encoder. The method includes deciding a prediction mode based on a type of a macroblock within a video image. The method also includes performing a transform of data within the macroblock. The method also includes determining a size for header bits and a size for texture bits within the macroblock based on the prediction mode and the transform. The method also includes performing a bit estimation function using the size for header bits and the size for texture bits.

Further according to the preferred embodiments, a method for predicting an illegal macroblock within a video encoder is disclosed. The method includes deciding a prediction mode based on a type of a macroblock within a video image. The method also includes performing a transform on data within the macroblock. The method also includes performing a bit estimation function to predict a size of the macroblock based on the prediction mode and the transformed data. The method also includes comparing the predicted size to a threshold.

Further according to the preferred embodiments, an encoder within a video transmission system. The encoder includes a mode selector to determine a prediction mode to apply to encode a macroblock within a video image. The encoder also includes a transform block to transform data within the macroblock. The encoder also includes a bit estimator to estimate a size of the macroblock based on the prediction mode and the transformed data and to apply a special prediction mode when the estimated size exceeds a threshold. The encoder also includes an entropy encoder to encode the macroblock according to the prediction mode or the special prediction mode.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed by the claims and their equivalents.

DETAILED DESCRIPTION OF THE PREFERRED EMBODIMENTS

Figure 1:
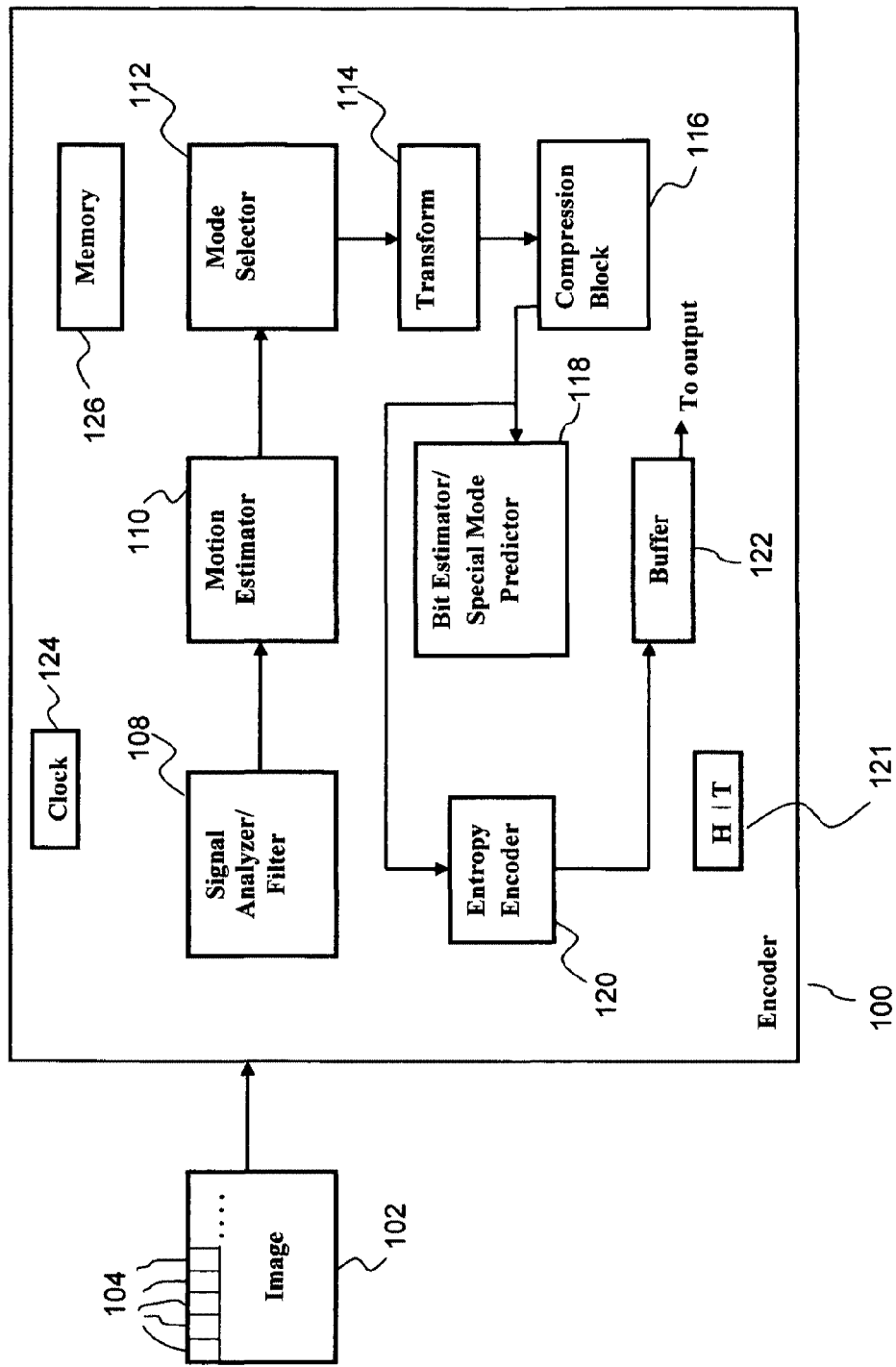
FIG. 1 illustrates a device for encoding an image frame using special prediction mode prediction according to the disclosed embodiments.

Aspects of the invention are disclosed in the accompanying description. Alternate embodiments of the present invention and their equivalents are devised without parting from the spirit or scope of the present invention. It should be noted that like elements disclosed below are indicated by like reference numbers in the drawings.

FIG. 1 depicts a device 100 for encoding an image frame 102 using a special prediction mode according to the disclosed embodiments. Device 100 also may be known as an encoder. The encoder may be part of a video transmission system, or part of a codec within a component of such a system.

Image frame 102 may be received by device 100 as part of a video signal. A number of image frames may be received in the video signal. Image frame 102 includes macroblocks 104. Each macroblock 104 includes two or more pixels. Preferably, a macroblock 104 has a dimension of 16 pixels by 16 pixels, but are not limited to this size. Macroblocks 104 are encoded by device 100 and sent to a decoder using a compression scheme or algorithm. Information sent may include an address of the macroblock within image frame 102, luminance information, chrominance and color information, compression block value and specific information about prediction mode used in the encoding process for the macroblock (type of prediction, motion information and the like).

Thus, video frame 102 may be partitioned into a plurality of macroblocks 104. In device 100, all of macroblocks 104 are encoded, buffered, and outputted. At times, the size of the coded macroblock 104 exceeds the size of the macroblock itself. This situation may arise when a significant change occurs between the macroblocks of one image to another. If so, less strain may be placed on the video transmission system by just transmitting the raw data of the macroblocks instead of the coded information. Referring back to device 100, image frame 102 is received for encoding. Device 100 includes a signal analyzer/filter 108 that analyzes incoming image frames and video signals to determine properties pertinent to the encoding or compression process. Analyzer/filter 108 may seek to remove noise or other distortion from the signal before implementing any compression steps. Analyzer/filter 108 also may identify the type of signal received or other gatekeeping activities for device 100. For the disclosed embodiments, analyzer/filter 108 may perform these activities on macroblocks 104 as they begin the encoding process.

Motion estimator 110 receives each macroblock 104 and determines whether it has moved with reference to its location in a previous frame. Motion estimator 110 also may perform spatial prediction to estimate the amount a spatial variation within macroblock 104. These values may be used by mode selector 112 to determine which prediction mode to use for encoding macroblock 104.

Mode selector 112 decides whether to use an inter-prediction mode or an intra-prediction mode for encoding macroblock 104. Inter-prediction mode may refer to a mode that uses temporal prediction, or information from previous frames, to estimate the values of macroblock 104. Redundant data does not need to be encoded. Intra-prediction mode relies upon spatial information to estimate values for macroblock 104.

Transform 114 performs operations to reduce information to be encoded by entropy encoder 120. Before the entropy encoding process, a compression block 116 may be used to reduce the amount of information even further. For example, a compression level may be used to reduce the values of the coefficients. Quantization may be used to compress the values of the coefficients. Device 100 may use different compression levels depending on the type of prediction mode and the differences between images.

Bit estimator 118 provides an estimate of the size of the encoded macroblock based on information received from mode selector 112, transform 114 and compression block 116. Bit estimator 118 estimates the number of possible header bits and texture bits of the encoded macroblock. Using this estimate, bit estimator 118 or encoder 100 may perform additional operations or take actions due to the estimated size. For example, bit estimator/special mode predictor 118 may decide whether to invoke the special prediction mode to encode macroblock 104 in order to avoid a potential illegal encoded macroblock. This process is disclosed in greater detail below.

Essentially, bit estimator 118, among other things, may help to determine whether possibility exists of macroblock 104 having an illegal block size. If so, then the special prediction mode may be used to prevent macroblock 104 from being encoded to a large size prohibited by device 100, and, instead, uses a special type of prediction. For example, the special prediction mode may not process the values of luminance and chrominance for macroblock 104 in its prediction operations in order to keep the encoded data size below the limit Bit estimator 118 also estimates the bits for an encoded macroblock to fine tune the compression level desired or recommended to meet rate control requirements. The compression level may be tweaked slightly, for example, if the estimated size of the encoded macroblocks trends upward or downward. Moreover, bit estimator 118 may help in slice size prediction. Scenarios where a very tight slice partitioning scheme is needed may require this type technique to avoid the re-encoding process to meet the requirements of slice partitioning.

Entropy encoder 120 may provide extra lossless compression of the coefficients for macroblock 104. Macroblock 104 now may be represented by an entropy coded set of bits that is sent to buffer 122, or encoded macroblock 121. Once macroblock 104 is encoded, the bits spent for the encoding may be divided into two main parts, as shown by 121H and 121T in encoded macroblock 121. Part 121H represents the bits encoded for the header bits of macroblock 104. Part 121T represents the texture bits of macroblock 104.

Header bits include information regarding the encoding process of macroblock 104. For example, this information includes the type of prediction (intra-prediction or inter-prediction) used for macroblock 104, and any additional information related to the prediction type.

For intra-prediction, header bits of part 121H may include information on the partitioning used on the pixels within macroblock 104, such as 16×16 or 4×4. Other information may include the mode of prediction to establish neighbors used from the intra-prediction.

For inter-prediction, header bits of part 121H may include information on the partitioning used, such as 16×16, 16×8, 8×8, and the like. The information also includes the direction of the prediction, such as backward, forward or both directions, and any reference used. The encoding process of the different information usually leads to the same amount of information being produced along with a predictable amount of maximum bits. Thus, the header bits of part 121H should be easy to estimate in bit estimator 118.

Part 121T of encoded macroblock 121 represents the part of the total number of bits from macroblock 104 that comes from the original image information. The original image information includes pixel values for luminance and chrominance. One way to use the original image information in the encoding process is through prediction error, which is a measure of the capability of the prediction process to estimate the original image. Prediction error may be determined from the difference between the predicted macroblock (inter or intra) and the original macroblock used. The difference will come for different encoding lossy compression tools, and encoded by entropy encoder 120. The resulting bits for this process will be the texture bits. The number of texture bits may vary from one macroblock to another.

The number of texture bits depends upon these factors. One is the prediction error, noted above. The higher the prediction error, then the more bits will be needed to encode it. The number of texture bits also depends upon the compression level used in the lossy tools. The higher the compression level, then the lower number of bits will result.

Texture bits of part 121T of encoded macroblock 121 will contribute the most to the total of bits. This value can result in encoded macroblock 121 to use from 0 bits to the equivalent size (or larger) on an uncompressed macroblock 104. For example, for a 4:2:0, 16×16 macroblock 104 using 8 bits per luma/chroma sample, the size of part 121T may be 3072 bits.

Thus, header bits have a maximum number of bits, but this maximum number is small compared to the macroblock size in bits. Thus, the estimation of the texture bits of part 121T is more important than the header bits as the amount of texture bits contributes greatly to the size of encoded macroblock 121.

Encoded macroblock 121 is received by buffer 122. From buffer 122, the encoded data is output from device 100.

Thus, device 100 may use different prediction modes to determine the values for pixels within macroblock 104 of image frame 102. If intra-prediction or inter-prediction results in data for macroblock 104 that is too large, then a special prediction mode is invoked to keep the size of the encoded data from exceeding the limit. The special prediction mode is selected after bit estimator 118 receives information from other components on macroblock 104 and provides an estimate for the size of encoded macroblock 121.

Figure 2:
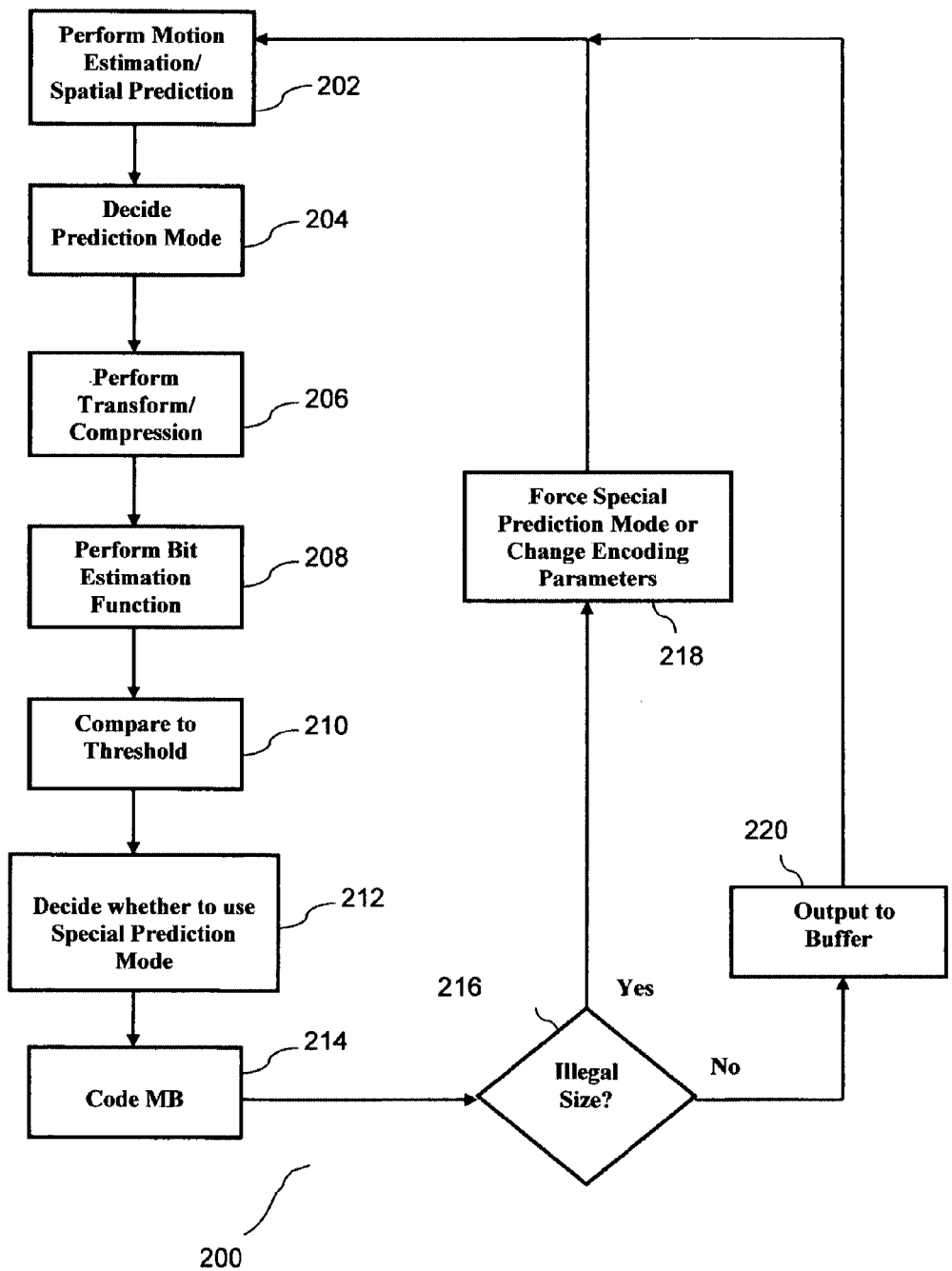
FIG. 2 illustrates a flowchart for providing bit estimation and deciding whether to use a special prediction mode according to the disclosed embodiments.

FIG. 2 depicts a flowchart 200 for deciding whether to use a special prediction mode according to the disclosed embodiments. The steps disclosed by flowchart 200 may be executed by the features of FIG. 1. Flowchart 200 may be executed for each macroblock 104 within image frame 102.

Step 202 executes by performing motion estimation or spatial prediction for the received macroblock 104. Motion estimation may refer to the motion vectors for pixels within macroblock 104. Motion is estimated, or predicted, using patterns within the macroblock. Spatial prediction seeks to determine pixel values within macroblock 104 based, again, on the data within the macroblock itself.

Step 204 executes by deciding on a prediction mode based on the motion estimation and spatial prediction information from step 202. Large amounts of motion or new data within macroblock 104 implies that inter-prediction methods may not be adequate. Step 204 determines which mode, inter-prediction or intra-prediction, is to be used in encoding macroblock 104.

Step 206 executes by performing the transform and applying specific compression level over the data from the prediction mode selected for the macroblock 104. Pixel data may be changed to coefficients suitable for encoding by device 100.

Step 208 executes by performing a bit estimation function to estimate the potential size of the encoded macroblock using the selected prediction mode. This estimate also may be used to determine whether to use the special prediction mode for encoding macroblock 104. Bit estimator 118 may use a function relating to the header bits of macroblock 104 (that represents the decided mode in step 204) and texture bits based on the data resulting from step 206. In other words, step 208 uses information generated in deciding the prediction mode and the compression scheme to determine whether to apply the special prediction mode.

The header bits may be a fixed contribution depending on the macroblock type from step 204. The header bits may be different from an inter-predicted macroblock as opposed to an intra-predicted macroblock. The header bits may be configurable for each macroblock type.

Texture bits may refer to the number of bits remaining after processing performed in step 206. Texture bits significantly contribute to illegally sized macroblocks. Thus, texture bits estimation is an important function of bit estimator 118. Texture bits estimation is based on a very accurate approximation of the real calculations performed in entropy encoder 120 for a final macroblock size. This may minimize the error and false alarm probabilities, so the impact will be close to null. A large number of texture bits imply that the encoded size also may be large. These values are combined to form a bit estimation value.

Figure 3:
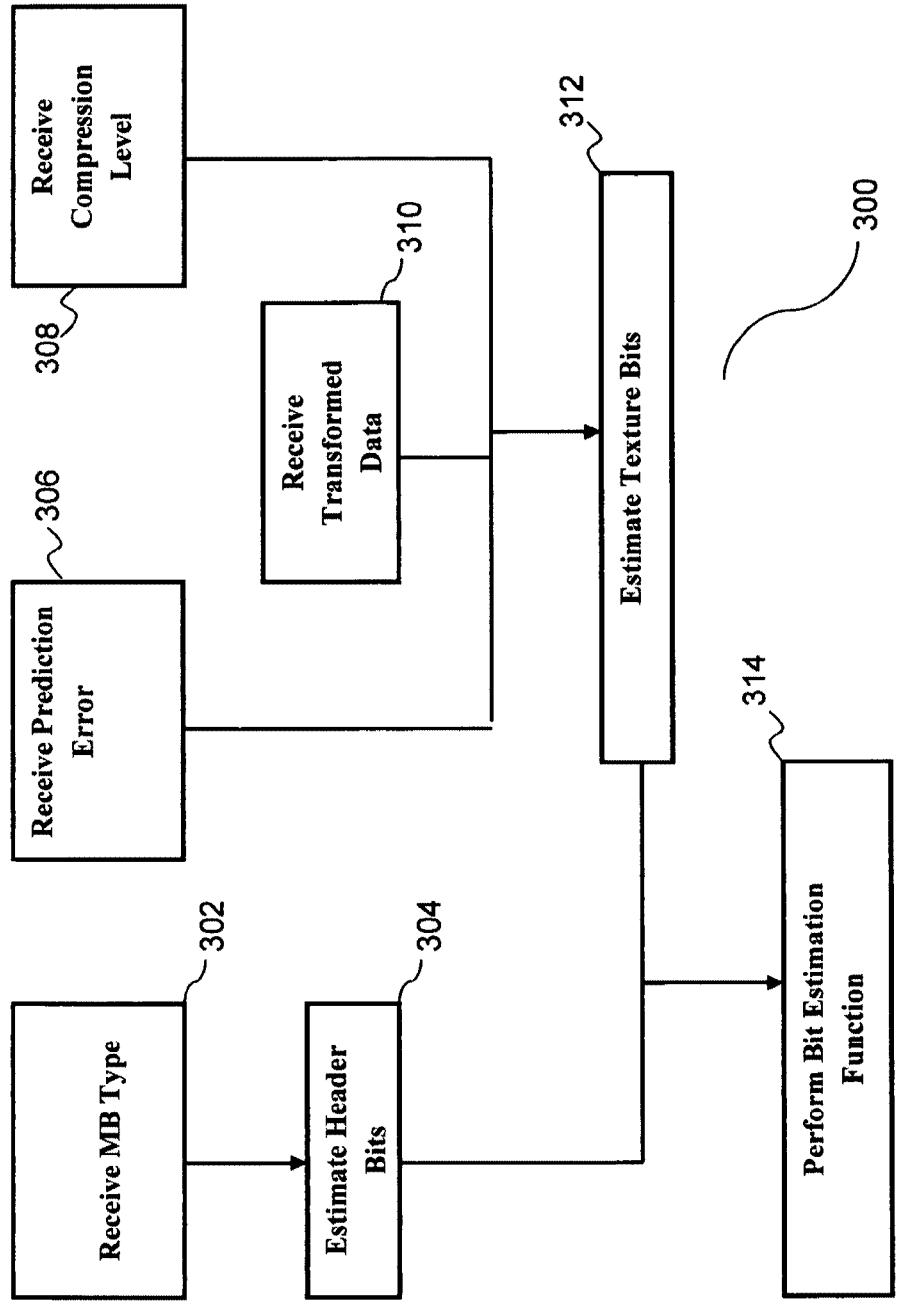
FIG. 3 illustrates a flowchart for performing a bit estimation function according to the disclosed embodiments.

Step 208 may be further disclosed with reference to FIG. 3. FIG. 3 depicts a flowchart 300 for performing the bit estimation function at bit estimator 118. Bit estimator 118 may receive the information disclosed below to estimate a size of the encoded macroblock after entropy encoding.

Step 302 executes by receiving the type of macroblock 104 based on the prediction mode selected in step 204. As noted above, header bits may differ based on whether inter-prediction or intra-prediction is used for macroblock 104. Step 304 executes by estimating a size for the header bits of macroblock 104 using the prediction type. Again, as disclosed above, the type of prediction will determine what values are in the header and its possible maximum size. For example, intra-prediction may place values for partitioning used, prediction to establish neighbors used for intra-prediction and other information. Inter-prediction may use values in the header for partitioning used, direction of the prediction, reference information and the like.

Step 306 executes by receiving a value for the prediction error determined in step 206 after transform of the data in macroblock 104. The higher the prediction error, then the more bits will be needed to encode it. Step 308 executes by receiving a value for the compression level used in step 206. Again, the higher the compression level, then the lower the number of bits that will need encoding. Step 310 executes by receiving the transformed data of macroblock 104. Using these values, step 312 executes by estimating the number of texture bits that will be in encoded macroblock 121.

Step 314 executes by performing a bit estimation function to estimate the size of encoded macroblock 121. The bit estimation function may add together the header bit estimate and the texture bit estimate to determine a bit estimation value for macroblock 104.

Step 210 executes by comparing the bit estimation value to a threshold. The threshold is configurable depending on false alarm rate and error probability. The threshold may be changed to reduce false alarms or error probability. Step 212 executes be determining whether to use the special prediction mode. If the bit estimation value is above the threshold, then the special prediction mode is used to avoid generating illegally-sized encoded macroblocks after entropy encoder 120. If the bit estimation value is below the threshold, then the prediction mode decided in step 204 is used.

Step 214 is executed by encoding macroblock 104. Using the selected prediction mode, data for macroblock 104 may be predicted and redundant data not encoded to reduce the size of the encoded macroblock. If the special prediction mode is selected, then macroblock 104 is encoded using that scheme, which may leave off some information to meet size limitations of device 100.

Step 216 executes by determining whether the encoded macroblock 104 has an illegal size. If yes, then step 218 executes by forcing the special prediction mode on encoding macroblock 104, or changing encoding parameters within device 100 for a re-encoded version of macroblock 104.

If step 216 is no, then the prediction mode decided in step 204 or the special prediction mode decided in step 212 was used. Thus, step 220 executes by outputting the encoded macroblock 104 to a buffer. Flowchart 200 then returns to receive another macroblock from age frame 102.

It will be apparent to those skilled in the art that various modifications and variations may be made in the disclosed embodiments of the privacy card cover without departing from the spirit or scope of the invention. Thus, it is intended that the present invention covers the modifications and variations of the embodiments disclosed above provided that the modifications and variations come within the scope of any claims and their equivalents.

What is claimed is:

1. A method for predicting an illegal macroblock within a video encoder, the method comprising:
    deciding a prediction mode based on motion estimation and spatial prediction for a macroblock within a video image;
    performing a transform on data and a specific compression level over the data within the macroblock from the prediction mode selected;
    performing a bit estimation function to predict a size of the macroblock based on the prediction mode and the transformed data;
    comparing the predicted size to a threshold; and
    applying a special prediction mode to encode the macroblock to reduce the size of the encoded macroblock when the predicted size exceeds the threshold.

2. The method of claim 1, wherein the performing the bit estimation function step includes estimating a number of header bits within the macroblock.

3. The method of claim 1, wherein the performing the bit estimation function step includes estimating a number of texture bits within the macroblock.

4. The method of claim 1, wherein the deciding step includes determining whether the macroblock is an inter-macroblock or intra-macroblock.

5. The method of claim 3, wherein the estimating the number of texture bits step includes determining a prediction error for the macroblock.

6. The method of claim 3, wherein the estimating the number of texture bits step includes determining a compression level for the macroblock.

7. The method of claim 1, further comprising encoding the macroblock according to the prediction mode.

* * * * *